Patented May 8, 1951

2,551,731

UNITED STATES PATENT OFFICE 2,551,731

POLYESTERS FROM HETEROCYCLIC COMPONENTS

James Gordon Napier Drewitt, Spondon, near Derby, and James Lincoln, London, England, assignors to Celanese Corporation of America, a corporation of Delaware No Drawing. Application October 28, 1947, Serial No. 782,677. In Great Britain November 12, 1946

13 Claims. (Cl. 260—75)

This invention relates to the production of polymers, and is especially concerned with polyesters and polyester-amides.

According to the invention, valuable polyesters are obtained by reacting a diol with a dicarboxylic acid or by reacting a hydroxy carboxylic acid with itself, one or both of the reagents containing a heterocyclic ring. In particular we use dicarboxylic acids in which two carboxylic groups are attached directly or through one or more atoms to a heterocyclic ring, the acids being such that their dimethyl esters melt above 100° C. and preferably at 120° C. or higher. Alternatively we may use diols similar in structure to the above dicarboxylic acids but with the COOH groups replaced by OH or $CH_2OH$ groups. The diols may be such that the two hydroxy groups are attached directly or through one or more atoms to a heterocyclic ring, and their acetates may melt above 100° C., and preferably above 120° C. Again we may use hydroxy carboxylic acids in which both the hydroxy group and the carboxy group are attached directly or through one or more atoms to a heterocyclic ring. Thus the compounds used in the present invention are of the general formula X—R—Y where X and Y are hydroxy or carboxy groups and R is a divalent radicle having a heterocyclic ring, the compounds being such that their derivatives of the formula $CH_3$—Z—R—Z—$CH_3$, where Z is the ester group —O.CO—, have a melting point above 100° C. and preferably above 120° C. By this means, high melting polyesters may be obtained.

The reagents are used in such proportions and the reaction continued for such a time that a product of molecular weight sufficient to form films is obtained. Preferably the reaction conditions are such that a polymer is obtained capable of forming films and/or of forming filaments orientable by cold-drawing.

Among the heterocyclic compounds which may be used according to the present invention are thiophene-2.4- and 2.5-dicarboxylic acids, furane-2.5-dicarboxylic acid, N-methyl-pyrrole-2.5-dicarboxylic acid, pyrane-2.6-dicarboxylic acid, pyridine-2.5-, 2.6- and 3.5-dicarboxylic acids, furane-2.5-diacrylic acid, 4.7-dioxy-quinaldine and 5-oxy-pyridine-2-carboxylic acid. The most suitable reagents are those in which the two reactive groups are attached directly or in the case of hydroxy groups either directly or through a single methylene group, to an unsaturated heterocyclic 5- or 6-membered ring in positions as remote as possible from each other. If the direct bond in such compounds is attached to a ring atom which is itself attached only to two other atoms, then the reactive group is substantially co-planar with the ring. Such is the case, for example in the 2.5-positions of thiophene, furane, pyrrole or pyridine, and this type of compound appears to be the best.

All the above reagents are free from functional groups other than the desired carboxylic and hydroxy groups, and such reagents are the preferred ones according to the present invention. However, other reagents can be used, as for example pyrrole-2.5-dicarboxylic acid, pyrazole-3.5-dicarboxylic acid, 4-methyl-pyrazole-3.5-dicarboxylic acid, 2.4.6-trimethyl-1.4-dihydro-pyridine-3.5-dicarboxylic acid, 3.5-dimethyl pyrrole-2.4-dicarboxylic acid and 4.4'- or 5.5'-benzal-bis-(2.4-dimethyl-pyrrol-3-carboxylic acid). Such compounds as the pyrrole-2.5-dicarboxylic acid and the 3.5-dimethyl-pyrrole-2.4-dicarboxylic acid may, prior to the condensation according to the present invention, be subjected alone to a preliminary condensation to form the cyclic amide, the product being then condensed with a diol in accordance with the invention.

As already indicated, the above heterocyclic di-acids and diols may be condensed with complementary heterocyclic compounds or with complementary compounds which are not heterocyclic. For example, a heterocyclic dicarboxylic acid may be condensed with a simple diol, as for example ethylene glycol, trimethylene glycol, tetramethylene glycol, hexamethylene glycol, decamethylene glycol, N.N'-di-oxyethyl-adipamide, propylene glycol, N-methyl-diethanolamine, dioxy acetone, 1.3-dioxy-2-chlorpropane, 1.4-dioxymethyl - benzene and 4.4' - dioxymethyl - diphenyl. Of these, the diols of the general formula $HO(CH_2)_nOH$, $n$ being an integer at least 2, are the most suitable. Similarly, the heterocyclic diols may be condensed with simple dicarboxylic acids, as for example succinic acid, glutaric acid, adipic acid, methyl adipic acids, pimelic acid, suberic acid, azelaic acid, sebacic acid, terephthalic acid, 4.4'-diphenic acid and para-phenylene-diacetic acid.

In carrying out polyester formation with relatively volatile diols, the di-acid can be heated, preferably in an inert atmosphere or stream of inert gas, with at least an equimolecular proportion of the diol, and preferably with an excess, e. g. 1.25–2.5 molecular proportions of the diol. The initial heating can be in the neighbourhood of 200° C., and subsequent heating at a temperature above the melting point of the polymer, say 220–280° C. The final heating may advantageously be carried out in a high vacuum, i. e. at an absolute pressure of less than 5 mms., and better still, less than 1 mm., of mercury. Similar considerations apply to the reaction with themselves of hydroxy-carboxylic acids and to the reaction of di-acids with non-volatile diols, but in the latter case it is preferred to use approximately equimoles of the two components, e. g. within 5%, or better within 2%, of the equimolar proportions.

In some cases a smoother reaction can be obtained by using a solvent, for example meta-cresol, for the ingredients and the resulting polymers. In place of the di-acid, there can be used the equivalent ester-forming derivatives of the acids, for example the dialkyl or diaryl esters, the corresponding half esters, the acid chlorides, the half-ester half-acid-chlorides or mixed anhydrides, e. g. with acetic acid, or a poly-anhydride or a half-ester-anhydride. It is particularly desirable to use the esters where acids are used which tend to be unstable and to develop carbon dioxide under the conditions of the reaction. When using di-esters, it is of advantage to include in the reaction mixture an ester interchange catalyst, as for example an alkali metal, magnesium or tin. Reactions with acid chlorides can be effected even at room temperature, and if desired a basic substance can be present, e. g. pyridine, to neutralize the hydrogen chloride evolved.

In a similar way the free diol may be replaced in the process of the invention by an equivalent ester-forming reagent. Thus, for example, instead of the diol, we may employ its mono- or di-formate or mono- or di-acetate, or we may use the dichloride or other dihalide, the chlorhydrin or other halohydrin (for example with the sodium or other suitable salt of the di-acid).

The reaction of a halohydrin with the disodium or other salt of the di-acid is of general application to the production of polyesters whether from the components described above or from other components, and is claimed in our co-pending U. S. Application S. No. 782,678, filed October 28, 1947. Of special interest is the initial reaction of 1–2 moles of the cheap ethylene chlorhydrin, which may be used in an excess over 2 moles with 1 mole of a di-salt of an appropriate di-acid, to produce a di-oxyethyl-ester (or a mixture of mono- and di-ester) which on heating is converted to the polyester.

If desired, mixtures of di-acids can be condensed with mixtures of diols, or a single di-acid can be condensed with a mixture of diols and vice versa, at least one of the components being of the heterocyclic character described above. Again, the components characteristic of the present invention can be co-condensed with other polyester-, polyurethane, or poly-amide-forming reagents. Examples of such co-condensations are the interaction of adipic acid, hexamethylene diamine, a diol and a di-acid; of ε-amino-caproic acid, a diol and a di-acid; of terephthalic acid, ethylene glycol and a di-acid; and of hexamethylene diamine, a diol and a di-acid. In each case either the diol or di-acid or both is of the heterocyclic character described. Such co-condensations permit the production of polymers with a large range of properties. For instance, the low moisture regain and poor dye affinity of the polyamide from hexamethylene diamine and adipic acid or of the polyester from terephthalic acid and ethylene glycol can be improved by incorporating even a small proportion of pyridine-2.5-dicarboxylic acid or a similar reagent, with or without a diol.

The polymers of the invention are of value in coating compositions and in moulding, and, when of sufficiently high molecular weight, can be spun into filaments. In forming filaments, the choice of the method of spinning depends in part on the properties of the polymers. Where solutions in organic solvents can readily be produced, dry spinning methods may be employed with solutions in volatile solvents, and wet spinning methods with solutions in volatile or even comparatively non-volatile solvents. The polymers can be spun by melt spinning methods, i. e. by extruding a melt of the polymer through suitable orifices. In general, the temperature of the polymer to be extruded should be some 10–30° above the melting point of the polymer. This melting temperature may be modified to some extent by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom.

The filaments so formed may be drawn out at comparatively low temperatures, or even at atmospheric temperature, to very fine filaments having high tenacity and good elasticity. The resulting filaments may then be used for any of the purposes to which artificial silks have in the past been applied.

While the invention is especially directed to the manufacture and application of fibre-forming polymers, it is not limited thereto and embraces the production of polymers suitable, for example, for use as softening agents, coatings, film-forming substances, and the like. Moreover, for these applications the polymers of the present invention may be mixed with other compatible fibre-forming, film-forming or lacquer substances or other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like. Further, the invention includes the preparation of higher polymers by further condensation of low polymers obtainable from the above described components.

The following examples illustrate the invention, all parts being by weight:

*Example 1*

18.4 parts (1 mole) of furane-2.5-dicarboxylic acid dimethyl ester (M. P. 109–110° C.) were mixed with 10 parts (about 1.6 moles) of ethylene glycol, and 0.025 part of sodium dissolved in 8 parts of methanol and a small quantity of magnesium ribbon added. The mixture was first heated at 160° C. for half an hour using a water-cooled reflux condenser and then for a further hour with an air-cooled reflux. At this stage the product was a crystalline mass with a melting point of under 120° C. The condenser was removed and the mass heated for 2 hours at 220° C. with the polymerising vessel open to the atmosphere. The vessel was then connected to a high vacuum pump and a hydrogen bubbling apparatus was fitted and the heating was continued with a stream of hydrogen bubbling through the molten mass and under an absolute pressure of 3 mms. of mercury, first at 190° C. for 2 hours and finally at 220° C. for 3 hours. The product had a melting point of 205–210° C. and readily yielded filaments from a melt. It showed on analysis a carbon content, on an ash-free basis, of 52.83%. The theoretical value for the infinite polymer

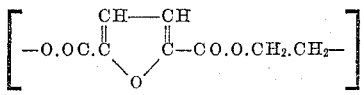

is 52.75%.

*Example 2*

Equal parts of furane-2.5-dicarboxylic acid and ethylene glycol (molar ratio 1:2.52) were refluxed for 3 hours at 180° C., and reflux condenser removed and heating continued for a further 4 hours at 210° C. A vacuum pump was then connected and heating continued for a further 7 hours at the same temperature and under an absolute pressure of 2 mms. of mercury. The resulting polymer had properties very similar to those of the product produced according to Example 1.

*Example 3*

15 parts (1 mole) of thiophene-2.5-dicarboxylic acid dimethyl ester (recrystallised from methanol, M. P. 152° C.), 7.5 parts (about 1.6 moles) of ethylene glycol, a solution of 0.025 part of sodium in 8 parts of methanol and a small quantity of magnesium ribbon were heated for 40 minutes at 160° C. under a water-cooled reflux in an atmosphere of hydrogen and then for 3 hours under an air-cooled reflux. The condenser was then removed and heating continued at 230° C. for 3 hours and then for a further 7 hours under an absolute pressure of 2–3 mms. of mercury with a temperature rising from 170° C. to 200° C. The product, melting point 180–190° C., readily gave fibres and had a carbon content, on an ash-free basis, of 49.14%. Theory for the infinite polymer

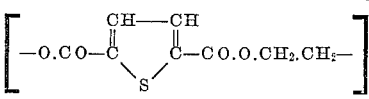

is 48.49%.

*Example 4*

15 parts (1 mole) of pyrazole-3.5-dicarboxylic acid dimethyl ester (recrystallised from benzene, M. P. 155° C.), 10 parts (about 2 moles) of ethylene glycol, a solution of 0.01 part of sodium in 8 parts of methanol and a small quantity of magnesium ribbon were heated in hydrogen first for 45 minutes at 160° C. under a water-cooled reflux and then for 2 hours at 180° C. under an air-cooled condenser. The condenser was then removed and heating continued for 1 hour at 200° C. and 2 hours at 225° C. Finally the polymer was heated for 5 hours at 200–210° C. under an absolute pressure of 2–3 mms. The resulting polymer, which was translucent, melted at 200–210° C.

Having described our invention, what we desire to secure by Letters Patent is:

1. Process for the production of polyesters, which comprises heating together until a polymer is produced reagents one of which is selected from the group consisting of diols whose hydroxy groups are their sole reactive groups and their ester-forming derivatives and which is present in proportion of more than one mole to each mole of the other reagent which is selected from the group consisting of dicarboxylic acids whose carboxylic groups are their sole reactive groups and their ester-forming derivatives, the dicarboxylic acid having both its carboxylic groups directly attached to a heterocyclic ring with conjugated unsaturation and having its dimethyl ester melting at above 100° C.

2. Process for the production of polyesters, which comprises heating together until a polymer is produced a polymethylene diol in a proportion of more than one mole to each mole of a substance selected from the group consisting a dicarboxylic acids whose carboxylic groups are their sole reactive groups and their ester-forming derivatives, the dicarboxylic acid having both its carboxylic groups directly attached to a heterocyclic ring with conjugated unsaturation and having its dimethyl ester melting at above 100° C.

3. Process for the production of polyesters, which comprises heating together until a polymer is produced an ester-forming derivative of a polymethylene diol in a proportion of more than one mole to each mole of a substance selected from the group consisting a dicarboxylic acids whose carboxylic groups are their sole reactive groups and their ester-forming derivatives, the dicarboxylic acid having both its carboxylic groups directly attached to a heterocyclic ring with conjugated unsaturation and having its dimethyl ester melting at above 100° C.

4. Process for the production of polyesters, which comprises heating together reagents one of which is selected from the group consisting of diols whose hydroxy groups are their sole reactive groups and their ester-forming derivatives and which is present in a proportion of more than one mole to each mole of the other reagent which is selected from the group consisting of dicarboxylic acids whose carboxylic groups are their sole reactive groups and their ester-forming derivatives, the dicarboxylic acid having both its carboxylic groups directly attached to a heterocyclic ring with conjugated unsaturation and having its dimethyl ester melting at above 100° C., and continuing the condensation until a filament-forming polymer is produced.

5. Process for the production of polyesters, which comprises heating together a polymethylene diol in a proportion of more than one mole to each mole of a substance selected from the group consisting of dicarboxylic acids whose carboxylic groups are their sole reactive groups and their ester-forming derivatives, the dicarboxylic acid having both its carboxylic groups directly attached to a heterocyclic ring and conjugated unsaturation and having its dimethyl ester melting at above 100° C., and continuing the condensation until a filament-forming polymer is produced.

6. Process for the production of polyesters, which comprises heating together an ester-forming derivative of a polymethylene diol in a proportion of more than one mole to each mole of a substance selected from the group consisting of dicarboxylic acids whose carboxylic groups are their sole reactive groups and their ester-forming derivatives, the dicarboxylic acid having both its carboxylic groups directly attached to a heterocyclic ring with conjugated unsaturation and having its dimethyl ester melting at above 100° C., and continuing the condensation until a filament-forming polymer is produced.

7. Process for the production of polyesters, which comprises heating together a substance selected from the group consisting of furane-2.5-dicarboxylic acid and its ester-forming derivatives and more than one molecular proportion of a polymethylene glycol, and continuing the condensation until a filament-forming polymer is produced.

8. Process for the production of polyesters, which comprises heating together a substance selected from the group consisting of thiophene-2.5-dicarboxylic acid and its ester-forming derivatives and more than one molecular proportion of a polymethylene glycol, and continuing the condensation until a filament-forming polymer is produced.

9. A linear polymer which yields on hydrolysis a diol whose hydroxy groups are its sole reactive groups and a dicarboxylic acid whose carboxylic groups are its sole reactive groups and are directly attached to a heterocyclic ring with conjugated unsaturation and whose dimethyl ester melts at above 100° C.

10. A linear polymer which yields on hydrolysis a polymethylene glycol and furane-2.5-dicarboxylic acid.

11. A linear polymer which yields on hydrolysis a polymethylene glycol and thiophene-2.5-dicarboxylic acid.

12. A linear polymer which yields on hydrolysis ethylene glycol and furane-2.5-dicarboxylic acid.

13. A linear polymer which yields on hydrolysis ethylene and thiophene-2.5-dicarboxylic acid.

JAMES GORDON NAPIER DREWITT.
JAMES LINCOLN.

REFERENCES CITED

The following references are of record in the file of this patent:

UNITED STATES PATENTS

| Number | Name | Date |
| --- | --- | --- |
| 1,853,049 | Hoover | Apr. 12, 1932 |
| 2,256,381 | Dickey | Sept. 16, 1941 |
| 2,274,831 | Hill | Mar. 3, 1942 |
| 2,327,131 | Salzberg | Aug. 17, 1943 |
| 2,343,808 | Schlack | Mar. 7, 1944 |
| 2,394,010 | Quarles | Feb. 5, 1946 |